United States Patent Office 3,272,958
Patented Sept. 13, 1966

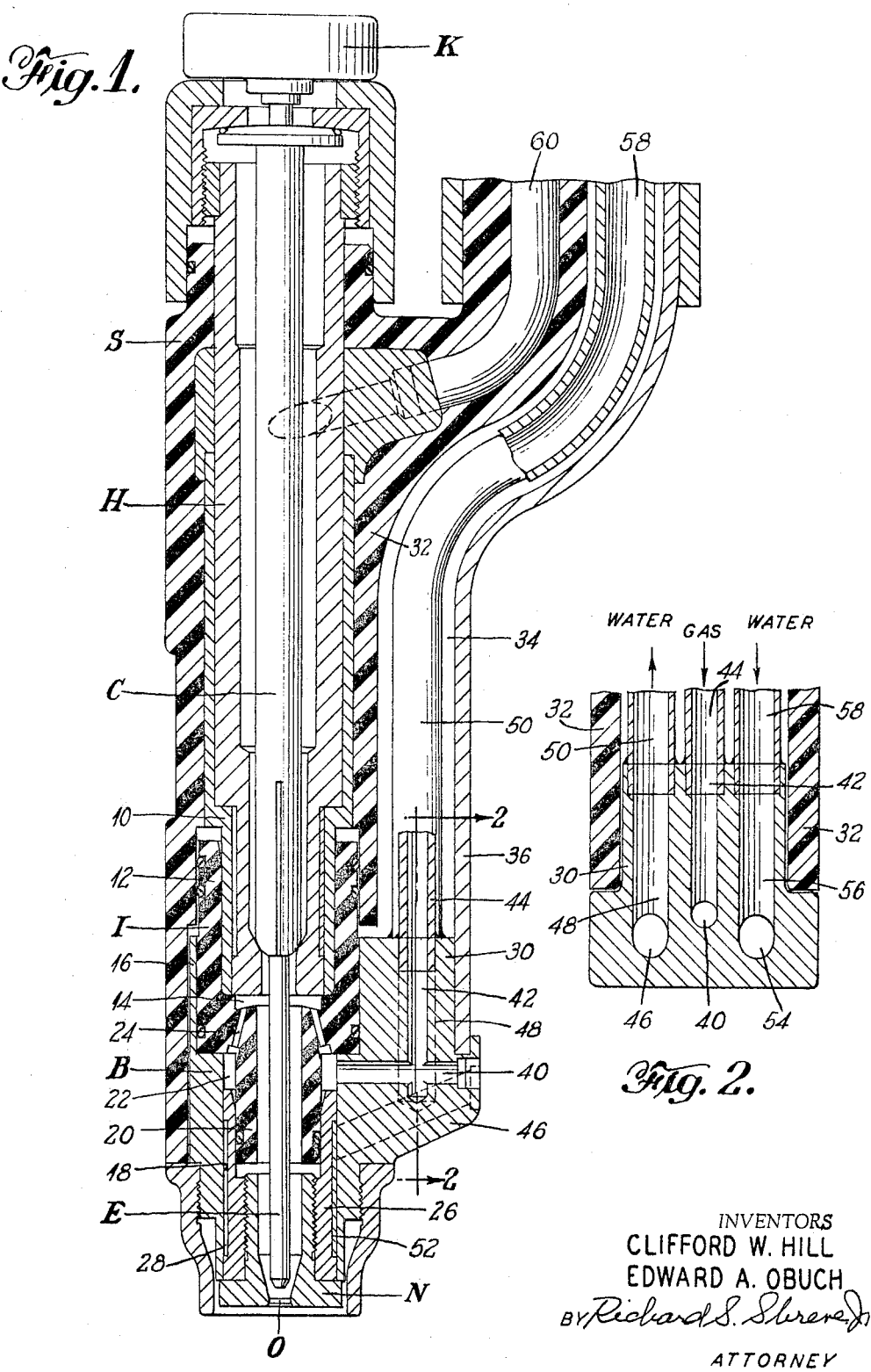

3,272,958
GAS SHIELDED ARC TORCH
Clifford W. Hill, Mountainside, and Edward A. Obuch, Linden, N.J., assignors to Union Carbide Corporation, a corporation of New York
Filed Mar. 18, 1964, Ser. No. 352,927
8 Claims. (Cl. 219—75)

This invention relates to gas shielded arc torches, and more particularly to such torches having a gas-directing nozzle with a constricted orifice.

Torches of this character have been subjected to pressure differentials and gas turbulence, and it is a principal object of this invention to reduce these disadvantages.

For this purpose the gas enters into a chamber and then passes through holes in an inner insulator in a direction away from the constricted orifice, to a second chamber from which it flows down in an annular stream surrounding the electrode, and then out through the constricted orifice.

Another object is to provide a simple and practical means to mount, seal, insulate, center and align the front body and tube assembly on the torch body assembly.

A significant problem of torch construction has been the failure of rubber and plastic seals causing water leakage at the hot end of the torch. This difficulty can be eliminated by bringing outside hoses down to the hot end of the torch. However, outside hoses protrude a significant distance from the torch, are exposed to damage, and prevent operation in close quarters.

Another object of the invention is to eliminate these difficulties. This is done by providing a molded channel in the torch body insulation which houses metallic tubes supplying the water, gas and pilot arc current to this hot end of the torch. These metallic tubes are brazed to the front body assembly and insulated in the channel, and the channel is closed by an insulating cover.

In the drawings:

FIGURE 1 is a vertical section through a gas shielded arc torch according to the preferred embodiment of the present invention; and FIGURE 2 is a vertical section taken along the line 2—2 of FIGURE 1.

The torch comprises a shell or sheath S of insulating material enclosing a barrel having a rear body forming a holder H in which is mounted an electrode contactor which in the form shown is a collet C for gripping an electrode E. An annular insulator I is interposed between the holder H and a front body B. The body B has a bore receiving a gas-directing nozzle N in the front end thereof, having a constricted orifice O. The rear end of the barrel is provided with a knob K for centering the electrode E in the orifice O.

The front end of the holder H is reduced to form a plug 10, and the rear of the insulator I is hollowed to form a cup 12 which receives the holder plug 10, but leaving ahead thereof a rear gas chamber 14.

The rear of the front body B has an enlarged bore forming a socket 16 receiving the cup 12 and a reduced bore 18 receiving a stem portion 20 of the insulator I, leaving therebetween a front gas chamber 22. A plurality, preferably eight, annularly spaced rearwardly directed bores 24 connect the front gas chamber 22 with the rear gas chamber 14.

Secured inside the front end of the bore 18 is a sleeve 26 having a peripheral groove 28 forming a cooling jacket and internally threaded to receive the nozzle N. The bottom of the groove 28 forming the inner wall of the cooling jacket is knurled to increase the heat transfer thereof.

The front body B has a lateral extension or shoulder 30 drilled to form passages to supply fluids thereto from inlets in the rear of the extension. The insulating sheath S has a corresponding extension 32 having a longitudinal outwardly open channel 34 formed therein to house supply tubes connected to the tubes of body extension 30. The channel 34 is closed by an insulating cover strip 36 applied over the tubes therein.

The gas chamber 22 is connected by a transverse drilling 40 to a longitudinal drilling 42 having an inlet socket in the top of the shoulder 30 in which is brazed the end of a metal gas supply tube 44. From this tube the gas flows through the passage formed by the drillings 40 and 42 into the chamber 22, thence through rearward directed passages 24 in the rear gas chamber 14. From the rear gas chamber 14 the gas flows forwardly in an annular stream surrounding the electrode and passing through the plug 20 and nozzle N, from which the gas flows out through the constricted orifice O.

The water jacket 28 is connected by a transverse drilling 46 to a longitudinal drilling 48 having an inlet socket in the top of the shoulder 30, in which is brazed the end of a water supply tube 50. From this tube cooling water flows through the passage formed by the drillings 46 and 48 at one side of a baffle 52 into the water jacket 28. From this jacket the water returns through transverse drilling 54 shown in FIGURE 2 at the other side of baffle 52 on up through longitudinal drilling 56 having an outlet in the top of shoulder 30. The inlet end of a water discharge tube 58 is brazed in the outlet of drilling 56.

The main electric current is supplied to the electrode E by a conductor 60 connected in the rear body or holder H, and flows through the collet or contactor C to the electrode E and out through the arc plasma in the constricted orifice O.

Pilot arc current is supplied to the nozzle N by a conductor (not shown) connected to one of the brazed tubes, for example to the water discharge tube 58, and passes through the shoulder 30 and front body B and sleeve 26 to the nozzle N.

What is claimed is:

1. In an arc torch, a barrel comprising a metal front body having an annular fluid chamber therein concentric with said barrel, said front body having a lateral extension eccentric to said barrel with a passage therein leading to said annular fluid chamber with an inlet therefor in the rear thereof, and a metal supply tube brazed to said inlet and extending rearwardly therefrom parallel and eccentric to said barrel.

2. Arc torch as claimed in claim 1, in combination with a insulating shell for said barrel having an outwardly open channel therein receiving said supply tube, and an insulating cover for said channel enclosing said supply tube therein.

3. In an arc torch, a barrel comprising a metal front body having a water jacket and a gas chamber therein concentric with said barrel, said front body having a shoulder with passages therein leading to said water jacket and said gas chamber with respective inlet sockets therefor in the rear thereof, and metal supply tubes respectively secured in said sockets and extending rearwardly therefrom parallel and eccentric to said barrel.

4. Arc torch as claimed in claim 3, in combination with an insulating shell for said barrel having a lateral extension with an outwardly open channel therein receiving said supply tubes, and an insulating cover for said channel enclosing said supply tubes therein.

5. In an arc torch, a barrel comprising a metal front body having an annular water jacket therein concentric with said barrel, the inner wall of said water jacket being knurled to increase the heat transfer thereof, said front body having a lateral water passage leading to said jacket, and a metal supply tube connected to said passage and extending rearwardly therefrom parallel and eccentric to said barrel.

6. In an arc torch, a barrel comprising a metal front body having a first gas chamber therein concentric with said barrel, said front body having a lateral passage therein leading to said first gas chamber, a gas-directing nozzle mounted on said front body, a second gas chamber in said barrel above said first gas chamber having an axial outlet to said nozzle, and rearwardly directed passages in said barrel leading from said first gas chamber to said second gas chamber.

7. In an arc torch, a front body having a central bore, an insulator in said bore, a first annular gas chamber between said insulator and said bore, said front body having a lateral extension with a gas inlet to said first chamber, a rear body having a lower portion in said insulator bore, a second annular gas chamber between said rear body portion and said insulator and open to said insulator bore, said insulator having rearwardly directed passages leading from said first gas chamber to said second gas chamber.

8. In an arc torch, a barrel comprising a metal front body having a lateral extension eccentric to said barrel, a metal gas-directing nozzle mounted on said front body, and a conduit connected to said lateral extension and extending rearwardly therefrom parallel and eccentric to said barrel for supplying pilot arc current to said gas-directing nozzle.

References Cited by the Examiner
UNITED STATES PATENTS

| | | | |
|---|---|---|---|
| 2,783,360 | 2/1957 | Osborn | 219—75 |
| 2,832,881 | 4/1958 | Andriola | 219—75 |

RICHARD M. WOOD, *Primary Examiner.*